(12) United States Patent
Refai et al.

(10) Patent No.: US 7,858,913 B2
(45) Date of Patent: Dec. 28, 2010

(54) LIGHT SURFACE DISPLAY FOR RENDERING A THREE-DIMENSIONAL IMAGE

(75) Inventors: Hakki H. Refai, Tulsa, OK (US); Erik Petrich, Norman, OK (US); James J. Sluss, Jr., Broken Arrow, OK (US); Monte P. Tull, Oklahoma City, OK (US); Pramode Verma, Tulsa, OK (US); Gerald K. Newman, Norman, OK (US); Martina Dreyer, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 807 days.

(21) Appl. No.: 11/789,767

(22) Filed: Apr. 25, 2007

(65) Prior Publication Data

US 2007/0247595 A1    Oct. 25, 2007

Related U.S. Application Data

(60) Provisional application No. 60/794,901, filed on Apr. 25, 2006, provisional application No. 60/796,249, filed on Apr. 28, 2006, provisional application No. 60/854,557, filed on Oct. 26, 2006.

(51) Int. Cl.
*H01L 27/00* (2006.01)
*G03B 21/26* (2006.01)

(52) U.S. Cl. .................. 250/208.1; 353/94

(58) Field of Classification Search ............ 353/79, 353/94; 348/107, 744; 359/326, 443
See application file for complete search history.

(56) References Cited

U.S. PATENT DOCUMENTS 5,243,665 A    9/1993  Maney et al.

(Continued)

FOREIGN PATENT DOCUMENTS

WO   PCT/US2009/031026    7/2009

OTHER PUBLICATIONS

Langhans, Knut, Felix 3D Display: An Interactive Tool for Volumetric Imaging, Proceedings of SPIE, vol. 4660, *Stereoscopic Displays and Virtual Reality Systems IX*, IS&T/SPIE's 14th International Symposium at Photonics West 2002 on Electronic Imaging: Science and Technology:, Jan. 20-25, 2002, San Jose, California, USA.

(Continued)

*Primary Examiner*—Que T Le
*Assistant Examiner*—Don Williams
(74) *Attorney, Agent, or Firm*—Dunlap Codding, P.C

(57) ABSTRACT

A light surface display for providing a three-dimensional image including a plurality of particles suspended within a volumetric display. A first projection system projects sequential slices of electromagnetic energy of one or more wavelengths along the length and width of the volumetric display energizing particles to form a two-dimensional image. A second projection system projects translational slices of electromagnetic energy of one or more wavelengths that intersect with the energized particles across the depth of the volumetric display. A control system synchronizes the projection of the image source and the activation source such that the two-dimensional image and the translational slices energize the particles for a pre-determined length of time so that the particles illuminate to form an illuminated three-dimensional image.

33 Claims, 6 Drawing Sheets

U.S. PATENT DOCUMENTS

| | | |
|---|---|---|
| 5,684,621 A | 11/1997 | Downing |
| 5,764,403 A | 6/1998 | Downing |
| 5,914,807 A | 6/1999 | Downing |
| 5,936,767 A | 8/1999 | Favalora |
| 5,943,160 A | 8/1999 | Downing |
| 5,956,172 A | 9/1999 | Downing |
| 6,064,423 A | 5/2000 | Geng |
| 6,466,184 B1 | 10/2002 | Whitesell et al. |
| 2002/0015218 A1 | 2/2002 | Bass et al. |
| 2003/0076281 A1 | 4/2003 | Morgan et al. |
| 2005/0062684 A1 | 3/2005 | Geng |
| 2005/0105151 A1 | 5/2005 | Kim |
| 2005/0264472 A1 | 12/2005 | Rast |
| 2006/0067651 A1 | 3/2006 | Chui |
| 2006/0068133 A1 | 3/2006 | Khoultchaev et al. |
| 2006/0078961 A1 | 4/2006 | Chiu et al. |

OTHER PUBLICATIONS

Downing, E., A Three-Color, Solid-State, Three-Dimensional Display, Science, vol. 273, Aug. 30, 1996.

PCT/US2009/031026, International Search Report, Aug. 28, 2009.

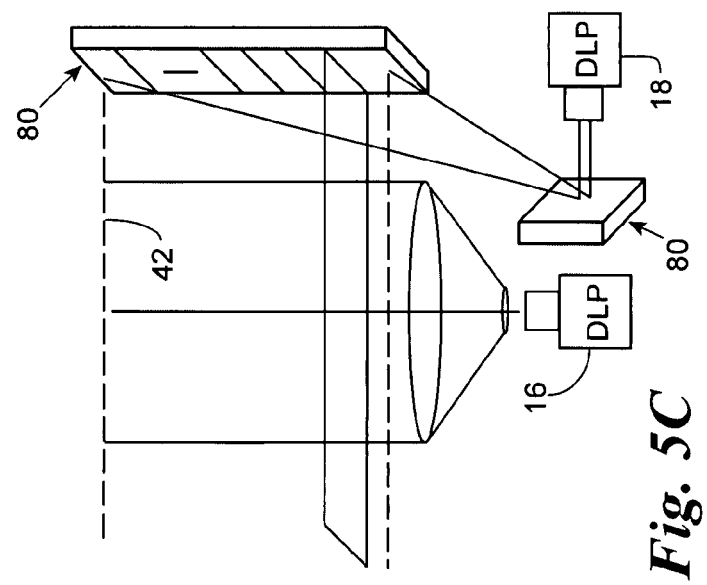
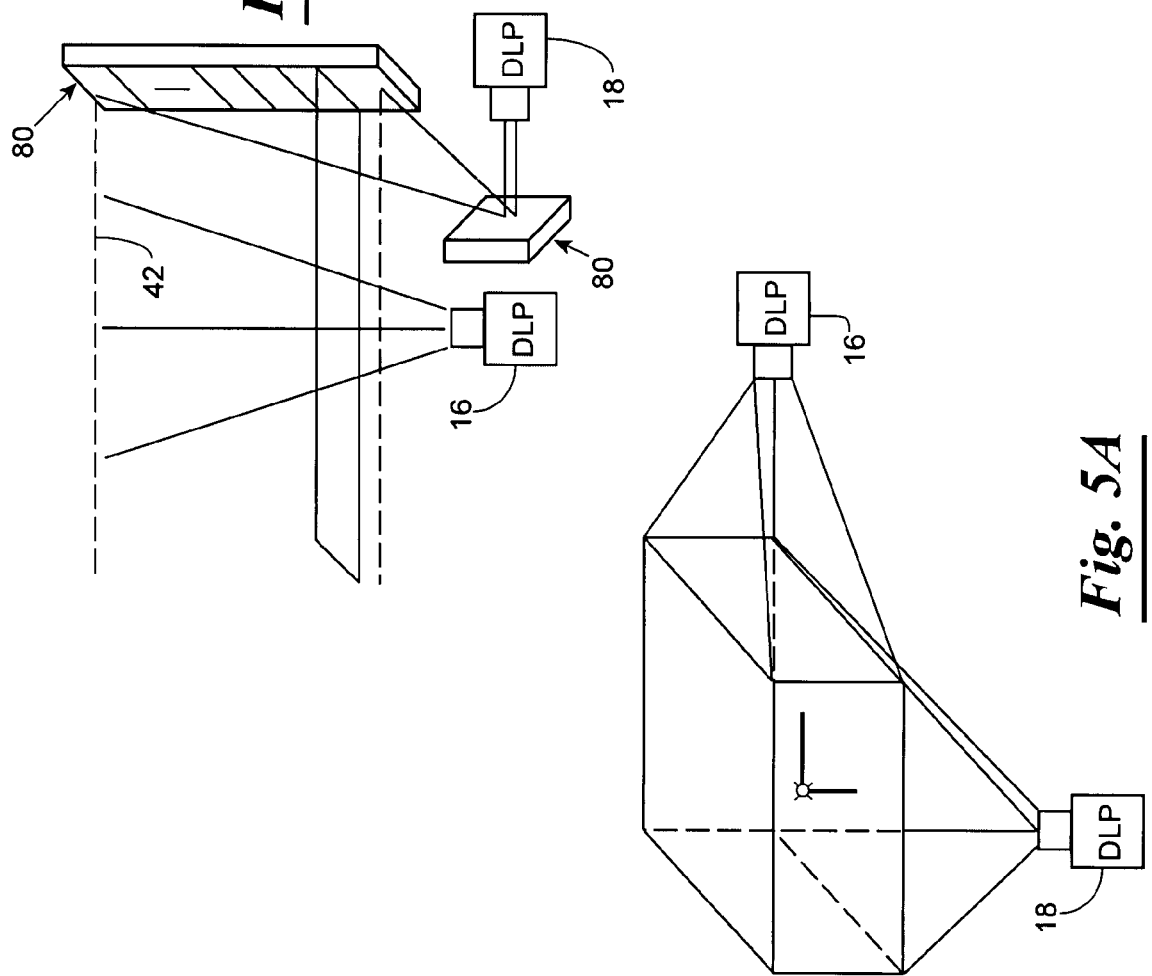
*Fig. 5A*
*Fig. 5B*
*Fig. 5C*

LIGHT SURFACE DISPLAY FOR RENDERING A THREE-DIMENSIONAL IMAGE

CROSS-REFERENCE TO RELATED APPLICATIONS

This Application claims priority under 37 C.F.R. 119(e) to U.S. Provisional applications U.S. Ser. No. 60/794,901, entitled COLORFUL TRANSLATIONAL LIGHT SURFACE 3-D DISPLAY, filed Apr. 25, 2006, U.S. Ser. No. 60/796,249, entitled COLOR TRANSLATIONAL 3-D VOLUMETRIC DISPLAY, filed Apr. 28, 2006, and U.S. Ser. No. 60/854,557, entitled 3-D LIGHT SURFACE DISPLAY, filed Oct. 26, 2006, each of which is hereby incorporated by reference in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A "SEQUENCE LISTING", A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

BACKGROUND OF THE INVENTION

Technological advances of the last decade have made scientists and engineers increasingly aware of three dimensional imaging as both viable and realistic. There is now widely acknowledged incentive, both commercially and industrially, for developing a color 3-D display system that can be viewed from unencumbered perspectives. Recent developments using micro-materials and nanostructure materials offer possibilities for creating novel optically-writable displays that are efficient and robust.

The three-dimensional displays currently available in the market, including static-volume displays and swept-volume displays, purport to construct three-dimensional images which are uniform in a 3-D image space and viewable from practically any orientation. In practice, these technologies have not fully achieved their objectives and possess several drawbacks including low resolution and translucent image representations.

Accordingly, a three dimensional imaging system and method of using the imaging system to provide better-quality images, as compared with the currently available technologies, will provide a commercially and industrially marketable product.

BRIEF SUMMARY OF THE INVENTION

The present invention is related to a light surface display for providing a three-dimensional image. In general, the light surface display includes a plurality of particles suspended within a volumetric display, that when energized by electromagnetic energy of two or more wavelengths, illuminate to form a three dimensional image.

In one embodiment, the light surface display includes a first projection system projecting wavelengths forming sequential slices of a two-dimensional image along the length and width of the volumetric display, and a second projection system projecting wavelengths forming translational slices across the depth of the volumetric display. A control system synchronizes the projections of the first projection system and the second projection system so that the wavelengths forming the two-dimensional image and the translational slices energize the particles in the volumetric display for a pre-determined length of time. The energized particles illuminate to form a three-dimensional image. The light surface display may produce a monochromatic or polychromatic image depending on the particular wavelength of electromagnetic energy and/or the types of particles utilized.

The particles within the volumetric display preferably include selectively-activated light sources activated by the incidence of one or more directional light sources such as lasers, coherent LED's, or the like. For example, particles may include micro and/or nano particles such as quantum dots, upconversion materials, or similar particles as long as the particles are selectively-activated by the incidence of a directional light source.

In one version, the first projection system projects wavelengths for a pre-determined amount of time prior to the second projection system in order to vary the color and/or intensity of each particle. The power of the first projection system may also be modulated to vary the intensity of the electromagnetic energy in order to vary the relative brightness of each particle. Additionally, the projection systems may include digital light processing projectors having digital micro-mirror devices containing an array of micromechanical mirrors. The micromechanical mirrors may be used in a plurality of array groups for dithering the translational slice to alter the relative brightness or color depth of each particle that represents a voxel.

The control system may optionally interface with an external source in order to provide images to the light surface display. The external source may include a computer, a processor, a game console, the Internet or the like.

In another embodiment, the light surface display further comprises a housing containing the volumetric display and/or projection systems. In addition to providing support for the volumetric display and/or projection systems, the housing provides an element of safety in securing the particles against outside contact with the user or spectator if needed. Additionally, the light surface display can include a filter, such as an electromagnetic radiation filter, preventing exposure of non-visible radiation to the user or spectator.

In another embodiment, the light surface display further comprises a medium that is substantially transparent and dispersed within the volumetric display. Preferably, the suspension of the particles is substantially uniform throughout the medium. The medium may be formed of high temperature transparent polymers, transparent aerogel materials, xenogel materials, or any other material that is substantially transparent and provides suspension of the particles within the volumetric display. The medium may be formed of inorganic substances, organic substances or combinations thereof.

In another aspect, the present invention is directed toward a method of using a light surface display to produce a three-dimensional image. The light surface display includes a plurality of particles suspended within a volumetric display. The particles are energized sequentially along the length and width of the volumetric display forming a two-dimensional image. The particles are further energized by intersection of electromagnetic energy along the depth of the volumetric display. The energizing of the particles is synchronized so as to form an illuminated three-dimensional image.

BRIEF DESCRIPTION OF THE SEVERAL VIEW OF THE DRAWINGS

So that the above recited features and advantages of the present invention can be understood in detail, a more particular description of the invention, briefly summarized above, may be had by reference to the embodiments thereof that are illustrated in the appended drawings. It is to be noted however that the appended drawings illustrate only typical embodiments of the invention and are therefore not to be considered limiting of its scope, for the invention may admit to other equally effective embodiments.

FIG. 5A is a schematic view of another embodiment of a light surface display providing a three-dimensional image in accordance with the present invention. FIG. 5B and FIG. 5C are exemplary versions of the light surface display of FIG. 5A.

DETAILED DESCRIPTION OF THE EMBODIMENTS

Figure 1:
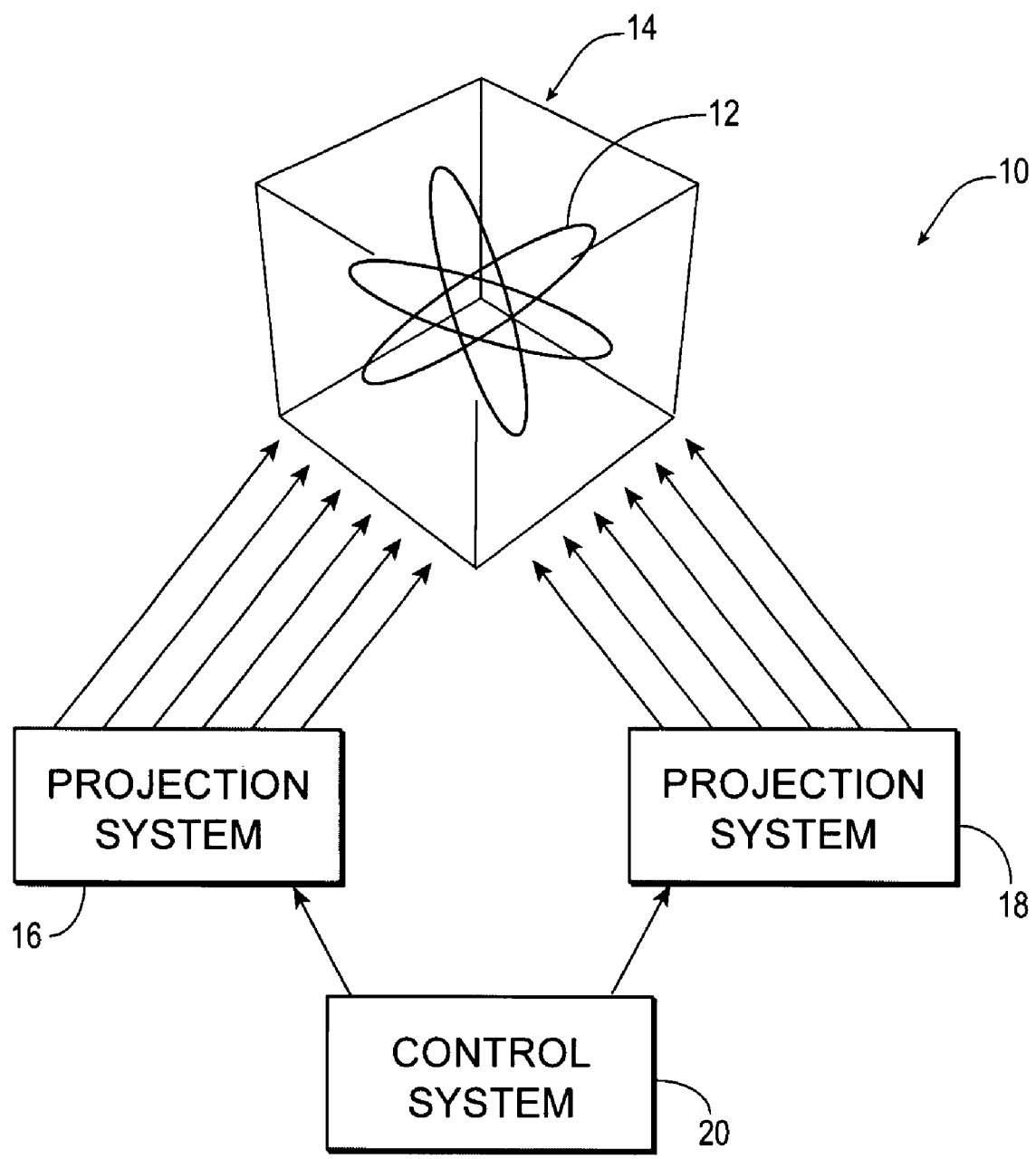
FIG. 1 is a schematic block diagram of a light surface display providing a three-dimensional image within a volumetric display in accordance with the present invention.

Present embodiments of the invention are shown in the above-identified figures and described in detail below. In describing the embodiments, like or identical reference numerals are used to identify common or similar elements. The Figures are not necessarily to scale and certain features in certain views of the Figures may be shown exaggerated in scale or in schematic in the interest of clarity and conciseness.

Referring now to the drawings, and in particular to FIG. 1, shown therein and designated by reference numeral 10 is a light surface display, constructed in accordance with the present invention, for providing a three-dimensional image 12 within a volumetric display 14. In general, the light surface display 10 includes a plurality of particles, suspended within the volumetric display 14, that when energized by electromagnetic energy, illuminate forming a three-dimensional image 12.

The light surface display 10 is provided with a first projection system 16 projecting electromagnetic energy of one or more wavelengths forming sequential slices of a two-dimensional image along the length and width of the volumetric display 14, and a second projection system 18 projecting electromagnetic energy of one or more wavelengths forming translational slices across the depth of the volumetric display 14. Although FIG. 1 demonstrates the use of two projection systems 16 and 18, it is contemplated that additional projection systems may be used to provide assistance in projecting electromagnetic energy of one or more wavelengths along the length, width, and/or depth of the volumetric display 14. Additional projection systems may provide better resolution, color selectivity, and/or brightness.

A control system 20 synchronizes the projections of the first projection system 16 and the second projection system 18 so that electromagnetic energy of the wavelengths forming the two-dimensional image and the translational slices intersect on individual particles to energize the particles for a pre-determined length of time. The energized particles illuminate to form the three-dimensional image 12. Depending on the amount of projection systems and/or type of particles in use, the light surface display 10 is able to produce monochromatic images and/or polychromatic images.

The particles within the volumetric display 10 preferably include selectively-activated light sources capable of activation by the incidence of one or more directional light sources such as lasers, coherent LED's, or the like. Activation of the particles adjusts the physical properties and/or characteristics displayed by the particles. In the preferred embodiment, activation provides visible light generation of varying wavelengths.

Particles may include micro and/or nano selectively-activated light sources or combinations of micro and/or nano selectively-activated light sources such as quantum dots, upconversion materials, or the like. For example, by varying the size and shape of quantum dots, and the depth of potential, the energy level of the quantum dots can be controlled. The discretional nature of the quantum dot bands means that the energy separation between the valence and conduction bands can be altered with the addition or subtraction of at least one atom. Predetermination of the quantum dot size fixes the emitted photon wavelength at about a specific color allowing quantum dots to be suitable selectively-activated particles for use in the light surface display 10.

Upconversion materials provide another example of suitable selectively-activated particles. Upconversion materials, in essence, convert lower energy beams into higher energy visible beams and can function as light emitting phosphors. Brightness obtained through the use of an upconversion material may be varied by altering the intensity of the electromagnetic energy impinging the surface of the upconversion material.

Upconversion materials may include a host material doped with a sensitizer and then further doped with rare-earth ions. For example, the particles may include fluoride crystal as a host material, doped with ytterbium ($Yb^{3+}$) as a sensitizer and further doped with rare-earth ions. The rare-earth ions may include erbium ($Er^{3+}$), holmium ($Ho^{3+}$), and thulium ($Tm^{3+}$), or other similar particles and/or lanthanides that are excited by and emit fluorescence at different wavelengths. Doping a fluoride crystal with $Er^{3+}$, $Ho^{3+}$, and $Tm^{3+}$ enables the fluoride crystal to emit red, green, and blue upconversion emitters, respectively. Other host materials, such as oxysulfide, and other rare-earth doping ions can also be used to construct the particles. It is contemplated that other selectively-activated particles may be used with the light surface display 10 as long as the particles are capable of activation by the incidence of one or more directional light sources.

Figure 2:
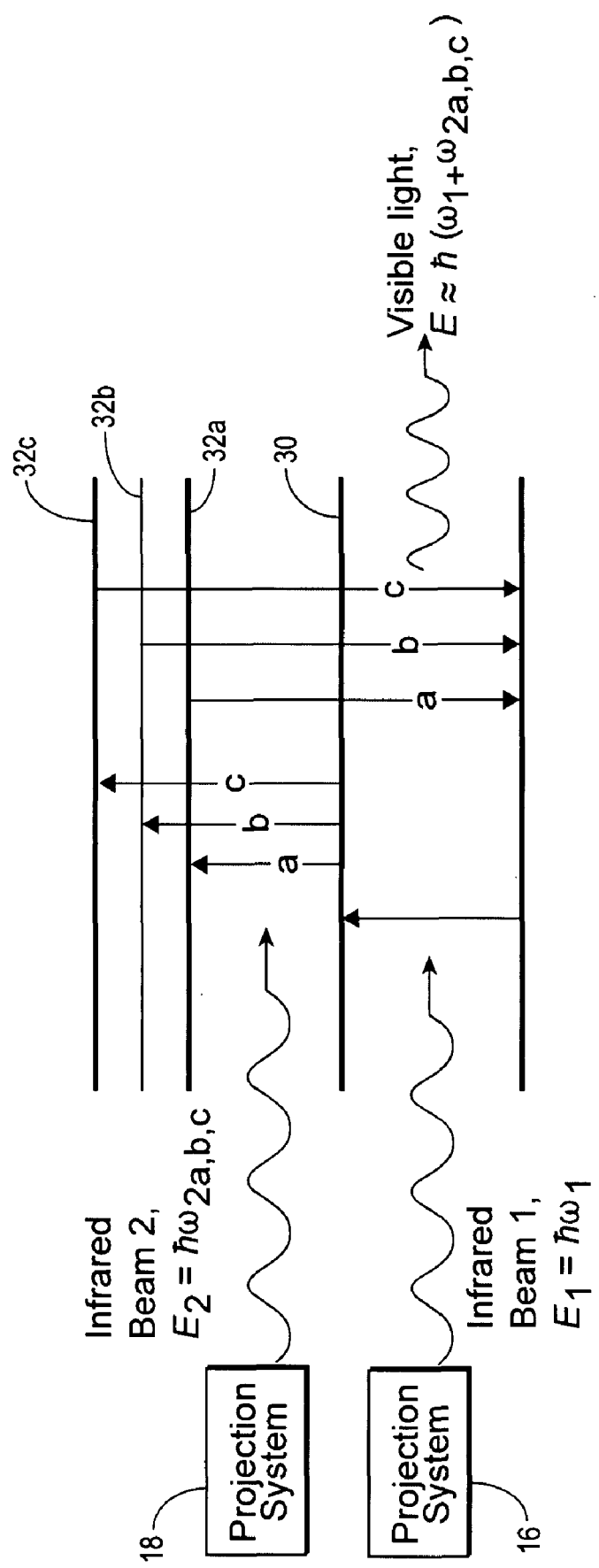
FIG. 2 illustrates exemplary wavelengths of visible light generated by energizing a particle with two wavelengths.

In general, exciting a particle with electromagnetic energy of different wavelengths produces visible light from the particle of a specified color depending on the utilized excitation wavelengths and the doping of the particle. For example, as shown in FIG. 2, if the first projection system 16 uses the common infrared wavelength 30 to all particles, then color selectivity is chosen according to a second wavelength 30 to 32a, 30 to 32b, or 30 to 32c, provided by the second projection system 18. Alternatively, each visible color can be emitted from the particle through the use of at least two different wavelengths without the need for a common wavelength. For example, six separate projection systems may provide six separate wavelengths ($W_1$, $W_2$, $W_3$, $W_4$, $W_5$, $W_6$), the combinations of which ($W_1 \times W_2$, $W_3 \times W_4$, $W_5 \times W_6$) provide for RGB color selectivity respectively. Alternatively, each projection system may provide for multiple wavelengths as discussed in more detail below.

Particles are suspended within the volumetric display 14. Substantial uniformity in the suspension of the particles through the volumetric display 14 is preferred. Particles may be suspended through magnetic suspension, convection currents, and/or dispersed within a medium.

Substantial uniformity in the dispersion of the particles within the medium is preferred. A suitable medium should include characteristics such as high transparency, durability, and/or low phonon energy. A phonon is a discrete amount of energy that a medium can absorb. If the medium absorbs the incoming energy, this energy will not be available for light emission, and therefore reduce the brightness of the light surface display 10.

The medium may be formed of high temperature transparent polymers, transparent aerogel materials, xerogel materials, or any other material permitting substantial uniformity of particle dispersion. The medium may be composed of an inorganic substance, an organic substance, or combinations thereof. For example, the medium can be an aerogel matrix in which the particles are synthesized with the aerogel matrix to create transparent optically-active monoliths. Aerogel matrices offer unique properties because they can be up to 99% air thus eliminating up to 99% of material interference with emitted light. This factor diminishes the light absorption within the aerogel matrix and allows for brighter light to be emitted. The aerogel matrix surface also does not touch the particles completely thus reducing surface contact and quenching effects on the emitted visible light of the particles.

The particles are dispersed much like a cloud within the aerogel matrix allowing for high illumination. An example of such an aerogel matrix includes, but is not limited to, silicon oxide aerogel. Silicon oxide aerogel matrices can be formed with surface areas of up to about 2000 $m^2/g$ and densities of about 0.002 $g/cm^3$ providing a high magnitude of surface area that is light accessible. However, it should be noted, that other types of mediums, including other aerogel matrices or polymers may be used, provided the medium allows for dispersal of the particles in at least a portion of the medium used to form the volumetric display 14.

Figure 3:
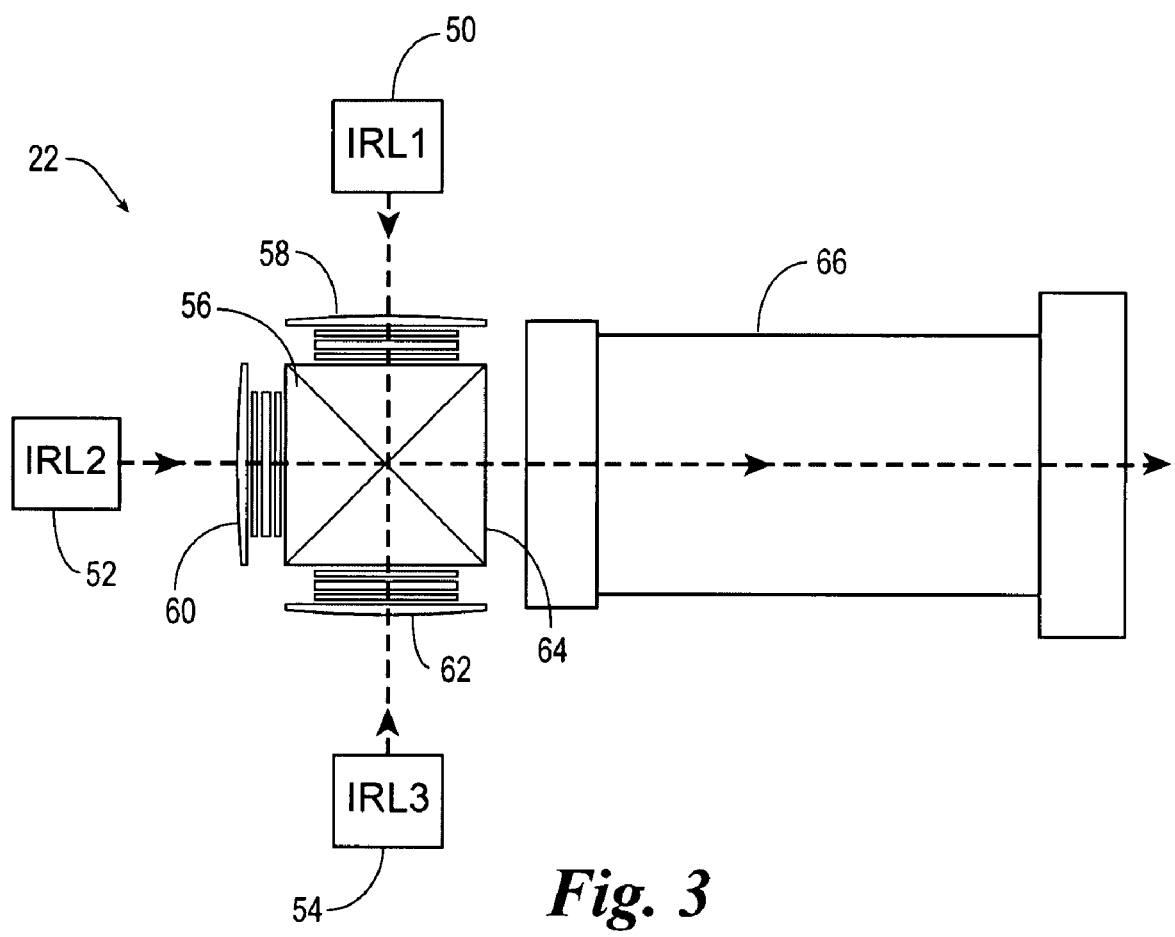
FIG. 3 is a schematic diagram of one example of a projection system in accordance with the embodiment of FIG. 1.

Referring now to FIGS. 1 & 3, using image projection technology such as digital light processing (DLP), grating light valve (GLV), and/or the like, the projection systems 16 and 18 provide electromagnetic energy of different wavelengths to energize the particles in the volumetric display 14.

In one embodiment, at least one of the projection systems 16 and/or 18 of the light surface display 10 uses DLP technology. Examples of DLPs include, but are not limited to, the Discovery 1100 model which uses 0.7 XGA DDR DMD which operates at 60 MHz DDR clock and provide 7.7 GbS data transfer rate and the Discovery 3000 which uses the 0.7 XGA LVDS DMD which operates at 200 MHz DDR clock and provides a 12.8 GbS data transfer rate.

In general, DLP includes a digital micromirror device (DMD) containing an array of micromechanical mirrors producing resolutions of super video graphics array (SVGA) 800×600 pixels; extended graphics array (XGA), 1024×768 pixels; 720 p 1280×72; and 1080 p, 1920×1080 pixels, pico-size DMD, and/or other like matrices.

FIG. 3 illustrates the projection system 18 using three-chip DLP technology with three different light sources, 50, 52, and 54. The light sources 50, 52, and 54 may include lasers, coherent LEDs, or the like. Other light sources may be used as long as the spectral line width of the light source is narrow and the output beam is directional. Each of the light sources 50, 52, and 54 provides a separate wavelength passing through a special four-sided prism 56. The prism 56 guides the wavelengths from each of the light sources 50, 52, and 54 to the corresponding DMD 58, 60, and 62 respectively. The wavelengths from each of the light sources, 50, 52, and 54 is reflected from the DMD surfaces, 58, 60, and 62 and combined. The combination is passed through an open fourth side 64 of the prism 56 to the projection lens 66. The projection lens 66 directs the combination towards the particles in the volumetric display 14.

Alternatively, the projection systems 16 and 18 may include grating light valve technology (GLV). GLV is a diffractive micro-opto-electro-mechanical system (MOEMS) spatial light modulator capable of very high-speed modulation of light combined with fine gray-scale attenuation. GLV is capable of projecting a one-dimensional array through a second dimension, creating a full high-definition image.

In another embodiment, in accordance with the present invention, the light surface display 10 utilizes both DLP and GLV technology in rendering a three-dimensional image 12. For example, in FIG. 1, the first projector system 16 may use DLP to create a series of 2D image slices, while the second projector system 18 uses GLV to create a series of transitional slices.

Figure 4A:
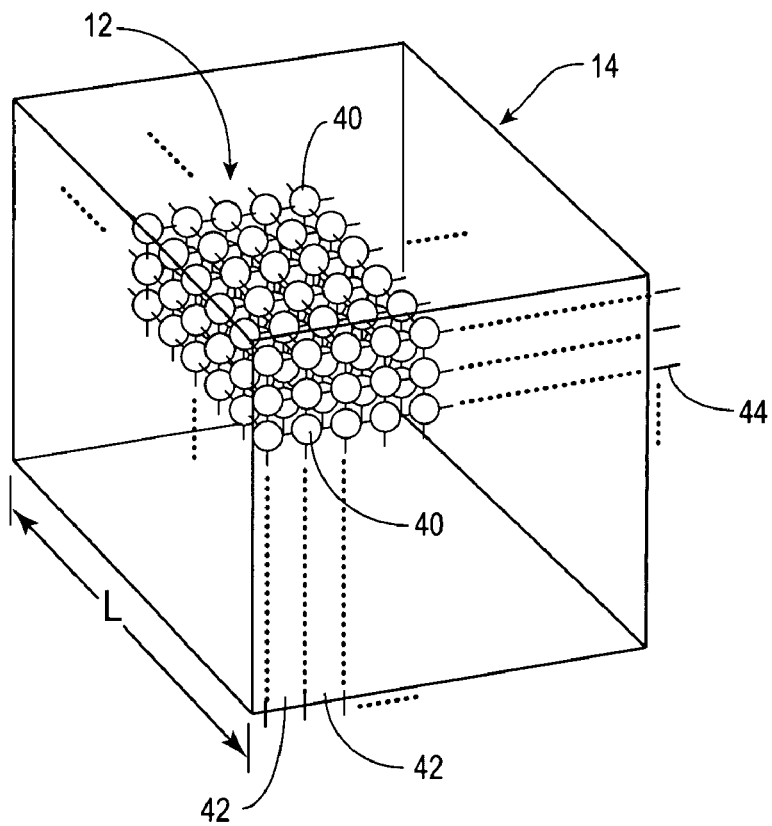
FIG. 4A is a perspective view of an embodiment of a light surface display providing a three-dimensional image within a volumetric display in accordance with the present invention.
Figure 4B:
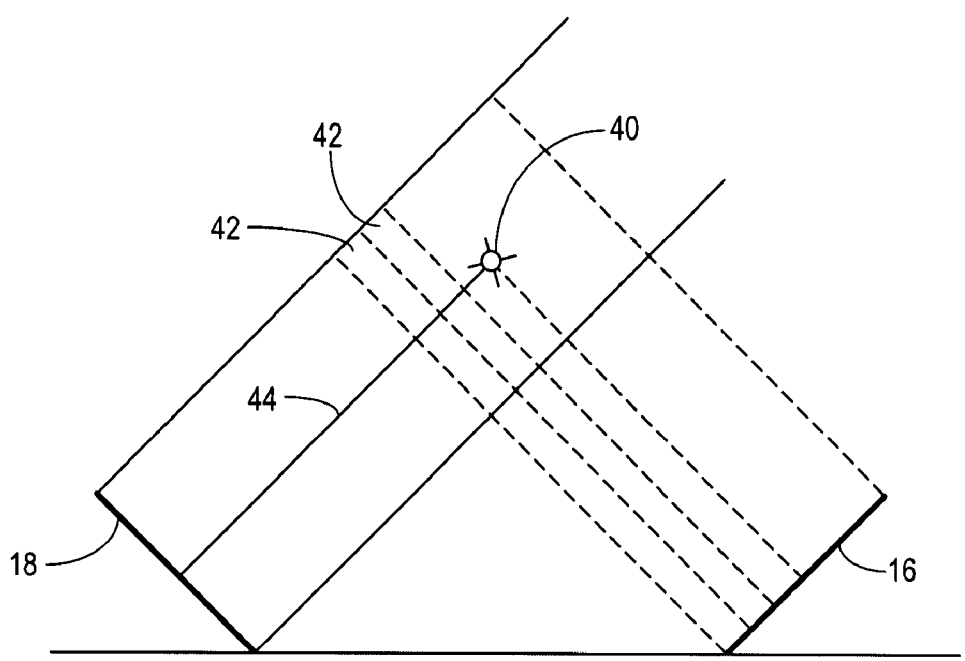
FIG. 4B is a schematic view of the light surface display in FIG. 4A.

As illustrated in FIG. 4, at least two projection systems 16 and 18 are utilized to construct the three-dimensional image 12 within the volumetric display 14. The intersection of the projected electromagnetic energy of the first projection system 16 and the second projection system 18 activates the particles creating voxels 40 forming the three-dimensional image 12.

The first projection system 16 may include a single DLP or a single GLV. The projection system 16 is used to project electromagnetic energy of one or more wavelengths to form sequential two-dimensional slices 42 projecting across the length and width of the volumetric display 14. The projected electromagnetic energy may include non-visible wavelengths, such as an infrared wavelength or an ultra-violet wavelength, or a combination of two or more infrared and/or ultra-violet wavelengths depending on the projection system and/or the particles utilized.

The second projection system 18 contains a single DLP or a single GLV. The second projection system 18 projects electromagnetic energy of one or more wavelengths to form planar translational slices 44 translating across the depth of the volumetric display 14. The projected electromagnetic energy can include non-visible wavelengths, such as an infrared wavelength or ultra violet wavelength, or a combination of two or more infrared and/or ultraviolet wavelengths depending on the projection system and/or the particles utilized.

In one embodiment, the projected electromagnetic energy from the first projection system 16 is the common infrared wavelength IRL0 forming the sequential two-dimensional slices 42, and the projected electromagnetic energy from the second projection system 18 consists of three different infrared wavelengths IRL1, IRL2, and IRL3 projected in sequence for each planar translational slice 44. To produce the planar translational slice 44, all of the micromirrors of the second projection system 18 are set to the off-state except the first column and/or row, depending on the physical positioning of the projection system 18 and/or volumetric display 14. The projection of the planar translational slice 44 is synchronized to the projection of the two-dimensional slices 42 from the first projection system 16. The approximately 90 degree intersection of the planar translational slice 44 with the two-dimensional slice 42 for a specified length of time energizes the particles at the intersection and creates an illuminated two-dimensional cross section at a specified location within the volumetric display 14. Changing the wavelengths of the planar translational slices 44 projected by the second projection system 18 provides the means to generate red, green, and/or blue, along with a multitude of colors based on the combinations of red, green, and/or blue.

To further create the three-dimensional image, all of the micromirrors in the second projection system 18 are again switched to the off-state except for a second column and/or row depending on the orientation of the second projection system 18 and/or volumetric display 14. A second intersection occurs between a second two-dimensional slice 42 and a second planar translational slice 44 illuminating a second two-dimensional cross section at a specific location in the volumetric display 14. It is possible for the second projection system 18 to project two or more columns and/or rows simultaneously for each planar translational slice 44.

Synchronizing the operations of both projection systems 16 and 18 allows the series of illuminated cross sections of the two-dimensional slice 42 and the planar translational slice 44 to appear at a depth within the volumetric display 14. Repeating the projections from the first projection system 16 and the second projection system 18 throughout the entire volumetric display 14 creates the three-dimensional image 12.

The resolution, color, and/or brightness of the image may be manipulated by altering the projection of electromagnetic energy from the projection system 16 and 18. For example, allowing for a pre-determined amount of time between projection by the first projection system 16 and projection by the second projection system 18 can vary the color and/or intensity of each particle. Activation by the first projection system 16 allows the particles to energize. A time-delay after projection by the first projection system 16 allows the energy to dissipate before activation by the second projection system 18. The dissipation of energy allows for variations in particle color and/or intensity. Additionally, altering the amplitude of wavelength of electromagnetic energy projected by either the first projection system 16 and/or the second projection system 18 can vary the intensity and vary the relative brightness of each particle.

As previously discussed, the projection systems 16 and 18 may include DLPs having digital micro-mirror devices containing an array of micromechanical mirrors. The micromechanical mirrors may be used in a plurality of array groups for dithering the translational slice to alter the relative brightness of each particle that comprises a voxel. In this technique, each particle receives electromagnetic energy that has been reflected from a plurality of micromechanical mirrors; the brightness is then controlled by selecting the number of micromechanical mirrors in this plurality. For example, using a 2×2 array of DLP micro-mirrors provides a relative color depth per voxel from zero to four depending on how many mirrors in the array group are activated at any given time. Larger micro-mirror array groups can provide correspondingly greater color depth. It is noted that this dithering method decreases the overall resolution of the display and that multiplexing the micro-mirrors in time or controlling the laser power and/or laser activation timing to provide color depth are the preferred embodiments.

As illustrated in FIGS. 5A, 5B, and 5C, the physical placement of the projection system 16 and 18 and/or directing of the electromagnetic energy provided by the projection systems 16 and 18 can provide for multiple viewing angles of the three-dimensional image 12. For example, as shown in FIGS. 5A and 5B a 270-degree viewing of the three-dimensional image 12 is produced when the first projection system 16, projecting the two-dimensional cross section, occupies one side of the volumetric display 14 and the projected planar transitional slices are projected by the second projection system 18 on the perpendicular side of the volumetric display 14. In another version, as illustrated in FIG. 5C, the first projection system 16 utilizes a beam expander to provide the array of electromagnetic energy in a collimated beam to the volumetric image space 14.

The planar transitional slices are projected to the volumetric display 14 through the use of a steering system 80. The steering system may include one or more mirrors, including deformable mirrors, that can be mechanically or electrically altered to guide the electromagnetic energy from the projection system 18 to the volumetric display 14.

Figure 6:
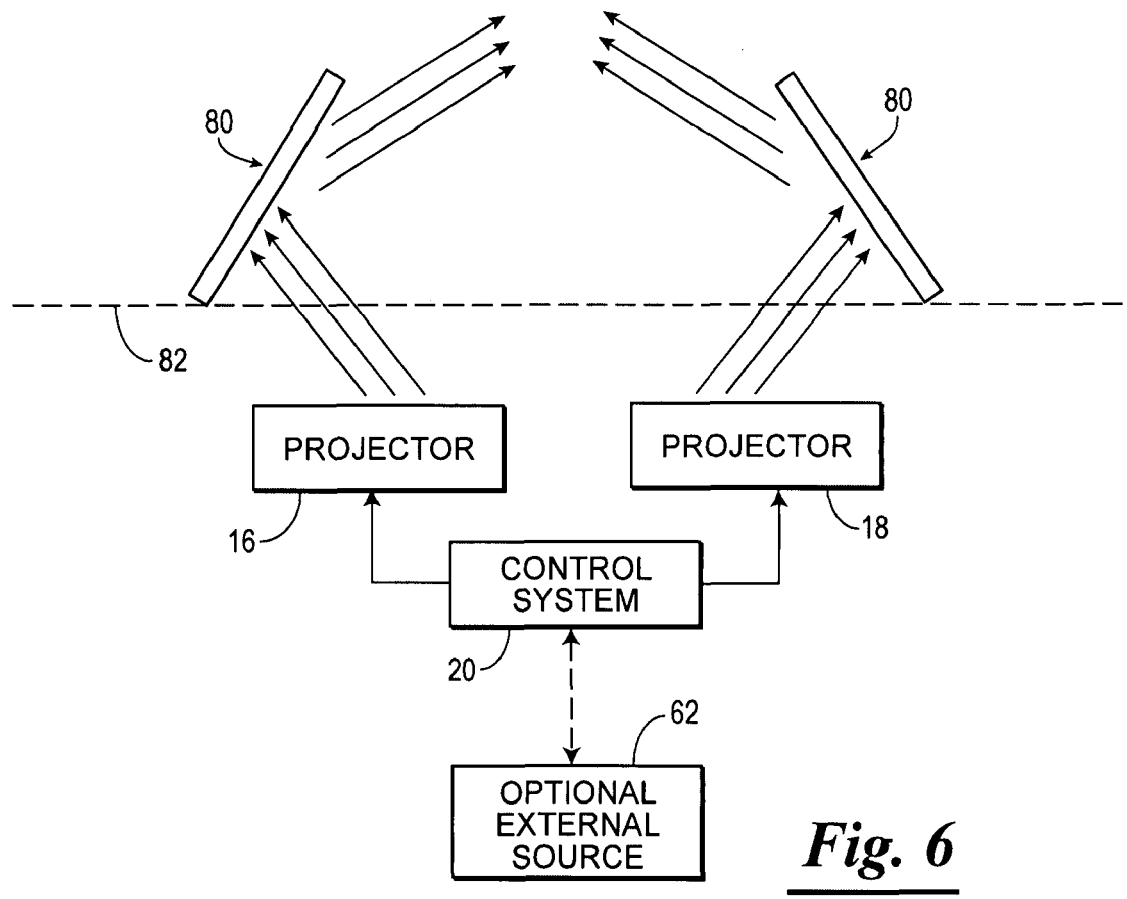
FIG. 6 is a schematic view of another embodiment of a light surface display providing a three-dimensional image in accordance with the present invention.

Alternatively, as shown in FIG. 6, the steering system 80 can provide 360 degree viewing by angling the projections from the first projection system 16 and the second projection system 18 so that they are tilted from a base 82. Preferably, electromagnetic energy from the first projection system 16 and the second projection system 18 will ideally intersect the particle at relative angles of approximately 90 degrees although other angles of intersection are contemplated. Having the intersection at an angle of approximately 90 degrees may eliminate any distortional dead zones resulting from voxel elongation, wherein the distortional dead zone is the region in which the size and/or shape of the individual voxels deviates substantially from the ideal. Control of the steering system may be provided by the projection systems 16 and 18, the control system 20, and/or mechanical manipulation by the user.

The control system 20 refreshes the images at a frequency sufficient to ensure that the user and/or spectator perceive the visual data as continually present. In one example, the volumetric display 14 is in the form of a rectangle with sides of lengths l×k comprising n by m pixels. Any combination of these n×m pixels can be activated during each refresh period. For example, if n=1024 rows, and m=768 pixels, the resultant number of pixels is 786,432 pixels generated using, the first projection system 16. Flicker considerations give rise to a minimum image refresh frequency. Therefore, if the second projection system 18 provides 333 slices across the depth of the volumetric display 14, the first projection system 16 and the second projection system 18, then the control system 20 refreshing the projection systems 16 and 18 at the same frequency, would provide 8000 images/sec from the first projection system 16 and 8000 images/sec from the second projection system 18. In this example, the generated volumetric display 14 would provide 225 million-voxels for a single color image and 85 million-voxels for a three-color image and 111 slices across the depth. The obtained three-dimensional image 12 is comprised of 24 three-dimensional images 12 per second (refresh rate).

In another example, the first projection system 16 utilizes a DLP projector with three different light sources simultaneously projecting the two-dimensional image and the second projection system 18 slices the two-dimensional images with a single light source such as a common infra-red laser. In this example, when the first projection system emits 1024× 768 images, and the second projection system slices 666 columns, synchronization by the control system 20 generates the volumetric display 14 with 500 million-voxels for multicolor images.

In another example, the projection systems 16 and 18 described herein operate at a rate of 16,000 frames/sec. The illuminated cross sections within the volumetric image space 14 take the form of rectangle comprised of n by m pixels. Any combination of these n×m pixels are activated during each refresh period. If n=1920 rows and m=1080 columns, the resultant number of pixels generated for each 2D cross section is 2.0736 million pixels. If the equivalent volumetric image space 14 provides an additional spatial dimension (depth) d equal to 666 slices generated then flicker considerations give rise to a minimum image refresh frequency equal to twenty-four-three-dimensional images/sec. The first projection system 16 will project a continuous combination of three mixed wavelengths to provide three color images at 16,000 images/sec.

To provide moving images, the three-dimensional image 12 is projected at least 24 times/sec, leading to a three-dimensional projection speed equal to 666 images/sec. The second projection system 18 switches 666 columns or rows to create 666 slices/sec, over the depth of the volumetric image space 14. The resultant projection system speed is 15984 frames/sec with a switching speed for the three different wavelengths at 7992 switches/sec. Thus, the volumetric image space 14, having more than 666 slices for the depth direction and 1,381 million voxels for multi-color image, gives a resulting three-dimensional image 12 comprised of twenty-four three-dimensional images/sec (refresh rate).

As illustrated in FIG. 6, the control system 20 may optionally communicate with an external source 62, such as a computer, processor, or the Internet, to provide external control, external programming, permitting measurement and reporting of information regarding the light surface display 10, and/or downloading of images to the control system 20. The external source 62 can be either proximally located to the light surface display 10 or located at a distance so long as there is communication between the control system 20 and the external source 62. Communication between the control system 20 and the external source 62 can be wired or wireless.

Figure 7:
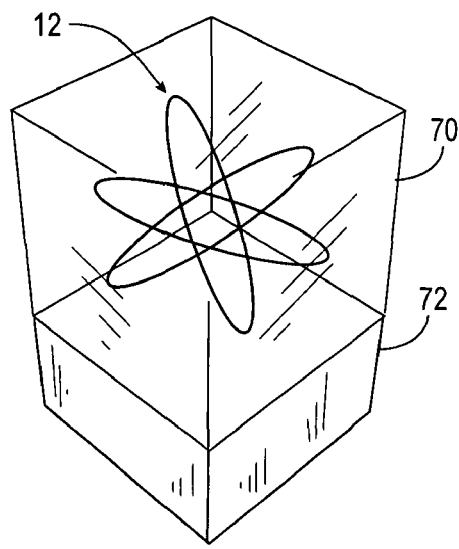
FIG. 7 is a perspective view of one version of a light surface display housing in accordance with the present invention.

As illustrated in FIG. 7, the light surface display 10 may optionally include a housing 70 containing the three-dimensional image 12. In addition to providing support for the particles, the housing 70 provides an element of safety in securing the particles against outside contact with the user or spectator. The housing 70 is constructed of a transparent material forming a transparent area so that a user or spectator located outside the housing 70 can view the image within the housing 70. It should be understood that the amount and/or shape of the transparent material forming the housing 70 can be varied depending upon a number of factors, such as the desired optical effect, or the end use of the light surface display 10. The housing 70 may additionally enclose the projection systems 16 and 18 and/or control system 20. The housing 70 is provided with an opaque area 72 so as to hide various parts of the light surface display 10 from the view of a user or spectator outside of the housing 70. For example, the projection systems 16 and 18 and/or control system 20 can be located adjacent to the opaque area 72 so as to hide the projection systems 16 and 18 and/or control system 20 from the user or spectator.

Additionally, the light surface display 10 can include a filter, such as an electromagnetic radiation filter, preventing exposure of non-visible radiation to the user or spectator. The filter may be integral to the housing 70 or separate from the housing 70.

As discussed above, the light surface display 10 is used to produce three-dimensional images 12. In using the light surface display 10, a volumetric space 14 is provided, wherein a plurality of particles are suspended within the volumetric space 14 via the medium, magnetic suspension or the like. Substantially-uniform dispersion of the particles within the volumetric space 14 is preferred. The particles are energized sequentially along the length and width of the volumetric display 14 through projection of electromagnetic energy of one or more wavelengths. The electromagnetic energy may be provided by one or more projection systems 16 and/or 18. The energized particles form a two-dimensional image along the length and width of the volumetric space 14. The particles are intersected with a projection of electromagnetic energy of one or more wavelengths along the depth of the volumetric display 14. The projection of electromagnetic energy along the length and width of the volumetric display 14 and the projection of electromagnetic energy along the depth of the volumetric display 14 are synchronized for a pre-determined length of time. Synchronization of the projections forms the illuminated three-dimensional image 12.

The foregoing disclosure includes the best mode for practicing the invention. It is apparent, however, that those skilled in the relevant art will recognize variations of the invention that are not described herein. While the invention is defined by the appended claims, the invention is not limited to the literal meaning of the claims, but also includes these variations.

What is claimed:

1. A light surface display for providing a three-dimensional image, comprising:
    a plurality of particles suspended within a volumetric display;
    a first projection system projecting sequential 2D image slices of electromagnetic energy of one or more wavelengths along the length and width of the volumetric display energizing particles;
    a second projection system projecting translational slices of electromagnetic energy of one or more wavelengths intersecting with the energized particles across the depth of the volumetric display to form sequential two-dimensional cross sections at specific locations in the volumetric display; and,
    a control system synchronizing the projection of the first projection system and the second projection system such that the sequential 2D image slices and the translational slices energize the particles for a pre-determined length of time so that the particles illuminate to form an illuminated three dimensional image.

2. The display of claim 1, further comprising a medium substantially transparent and dispersed within the volumetric display wherein the particles are suspended within the medium.

3. The display of claim 2, wherein the medium is an aerogel matrix.

4. The display of claim 2, wherein at least a portion of the aerogel medium is composed of an inorganic substance.

5. The display of claim 2, wherein at least a portion of the aerogel medium is composed of an organic substance.

6. The display of claim 2, wherein the medium is an xerogel matrix.

7. The display of claim 6, wherein at least a portion of the xerogel matrix is composed of an inorganic substance.

8. The display of claim 6, wherein at least a portion of the xerogel matrix is composed of an organic substance.

9. The display of claim 2, wherein the medium is a transparent glass ceramic matrix, a portion of transparent glass ceramic matrix composed of an organic substance.

10. The display of claim 1, wherein the particles are quantum dots.

11. The display of claim 1, wherein the particles are upconversion materials.

12. The display of claim 11, wherein the upconversion materials includes a host material doped with a sensitizer and rare-earth ions.

13. The display of claim 12, wherein the sensitizer is Ytterbium.

14. The display of claim 12, wherein the rare-earth ions are lanthanides.

15. The display of claim 1, wherein the particles are upconversion materials suspended within an aerogel matrix.

16. The display of claim 15, wherein the display produces a polychromatic three-dimensional image.

17. The display of claim 1, wherein the first projection system includes at least one digital light processing projector.

18. The display of claim 1, wherein the second projection system includes at least one digital light processing projector having a digital micro-mirror device containing an array of micromechanical mirrors.

19. The display of claim 18, wherein the micro-mirror device is used in dithering the translational slices of electromagnetic energy.

20. The display of claim 1, wherein the first projection system projects wavelengths for a pre-determined amount of time prior to the second projection system projecting wavelengths intersecting the energized particles.

21. The display of claim 1, wherein power of the first projection system is modulated to vary the intensity of electromagnetic energy of the wavelengths along the length and width of the volumetric display.

22. The display of claim 1, wherein the first projection system includes a beam steering system for directing the wavelengths of the first projection system.

23. The display of claim 1, wherein the control system is in communication with an external source to download images.

24. The display of claim 1, further comprising a housing supporting the volumetric display.

25. The display of claim 24, wherein the housing includes an electromagnetic radiation filter.

26. A method of producing a three-dimensional image, comprising:

energizing particles suspended within a volumetric display sequentially along the length and width of the volumetric display through projection of electromagnetic energy of one or more wavelengths, the energized particles forming a series of 2D image slices;

intersecting the energized particles through projection of electromagnetic energy of one or more wavelengths in a series of translational slices along the depth of the volumetric display to form sequential two-dimensional cross sections at specific locations in the volumetric display; and, synchronizing the projection of electromagnetic energy along the length and width of the volumetric display with the projection of electromagnetic energy along the depth of the volumetric display for a pre-determined length of time forming an illuminated three-dimensional image.

27. The method of claim 26, wherein projection of electromagnetic energy of one or more wavelengths is performed by a first projection system including a single digital light processor.

28. The method of claim 27, wherein power of the first projection system is modulated to provide variable brightness of the image.

29. The method of claim 26, wherein the projection of electromagnetic energy of one or more wavelengths along the depth of the volumetric display is performed by a second projection system including a single digital light processor having a digital micromirror device with an array of micromechanical mirrors.

30. The method of claim 29, further comprising the step of dithering the micromechanical mirrors to provide variable brightness of the image.

31. The method of claim 26, further comprising the step of providing a pre-determined time-delay before intersecting the energized particles through projection of electromagnetic energy of one or more wavelengths along the depth of the volumetric display.

32. The method of claim 26, wherein the particles are supported by an aerogel matrix.

33. The method of claim 26, wherein the particles are substantially uniformly suspended.

* * * * *